(No Model.)

F. M. ROOTS.
SHAFT COUPLING.

No. 349,365. Patented Sept. 21, 1886.

Attest.
C. W. Miles
Horace W. Males.

Inventor.
Francis M. Roots
By Geo. J. Murray Atty

UNITED STATES PATENT OFFICE.

FRANCIS M. ROOTS, OF CONNERSVILLE, INDIANA.

SHAFT-COUPLING.

SPECIFICATION forming part of Letters Patent No. 349,365, dated September 21, 1886.

Application filed January 19, 1886. Serial No. 189,061. (No model.)

*To all whom it may concern:*

Be it known that I, FRANCIS M. ROOTS, a citizen of the United States, and a resident of Connersville, in the county of Fayette and State of Indiana, have invented certain new and useful Improvements in Shaft-Couplings, of which the following is a specification.

The object of my invention is to provide a cheap, durable, and reliable flexible coupling for shafts, which in use will permit the connected shafts to run smoothly without jar or friction, even though the connected parts are not in exact axial alignment.

With this object in view my invention consists in the combination of two flexible metallic disks, each having a hub to be secured upon the end of the shaft-section. The pair of disks, when united, have flanges or an intervening ring between their adjacent faces, at or near the periphery, to separate them from each other, so as to permit the disks to spring independent of each other, to compensate for any variation from axial alignment of the shaft-sections coupled by them.

Figure 1:
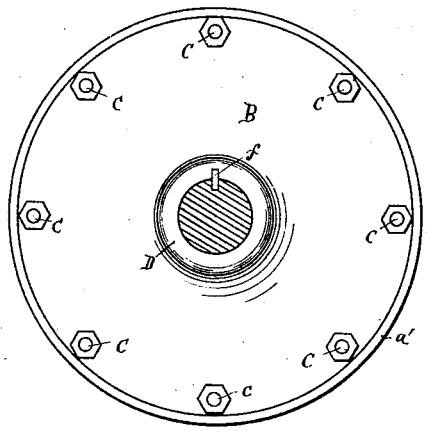
Figure 3:
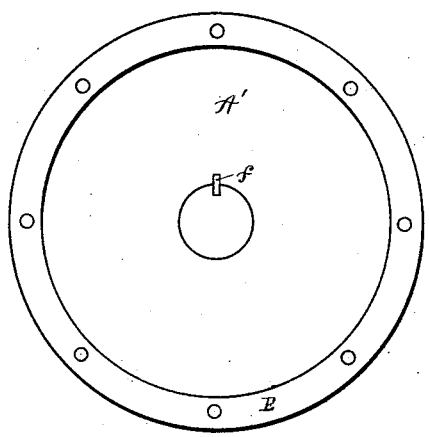
Figure 2:
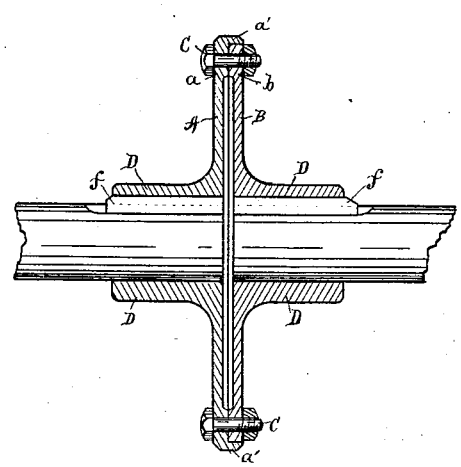
Figure 4:
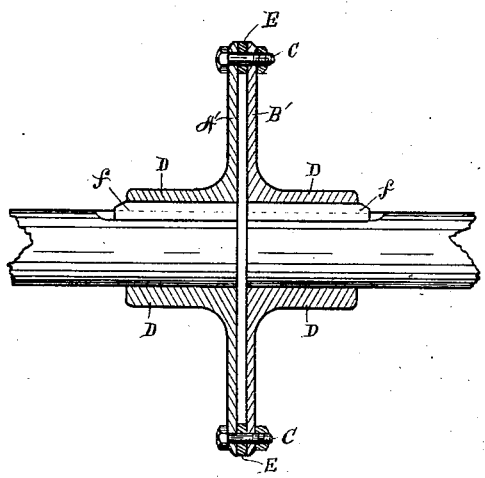

In the accompanying drawings, in which like parts are represented by similar reference-letters wherever they occur throughout the various views, Figure 1 is a side elevation of my preferred form of coupling secured in place upon the shaft, which is shown in transverse section. Fig. 2 is an axial section through the same. Fig. 3 is a face elevation of one side of a modified form of my coupling and the separating-ring in position upon it, the opposite side being removed. Fig. 4 is an axial section of Fig. 3.

In my preferred form of coupling (shown in Figs. 1 and 2) the disks A and B have annular flanges $a$ and $b$ projecting from their adjacent faces. These flanges are turned off true to join with each other, and the edges perforated to receive screw-bolts C, by which the two members are firmly held together. The disk A has also an overlapping flange, $a'$, and the disk B is small enough to snugly fit within this flange. This construction makes a neat finish and adds strength to the coupling; but it is not essential, as both members of the coupling may be like the member B. To save labor of fitting, the hubs D are made in one piece with the disks; but the same result would be accomplished by making the hubs separately and uniting them to the disks in any approved manner.

In the modification shown in Figs. 3 and 4 the disks A' and B' are made plain upon their adjacent faces, the flanges $a$ and $b$ being omitted, and the ring E substituted in place of them, the bolts C, passing through the disks and ring, firmly clamping the parts together. The coupling is secured upon the shaft-sections by a key, $f$; or set-screws may be used instead of the key, if desired.

I prefer to make my coupling of cast metal, and have found in practice that it has sufficient flexure for general purposes. If, however, extraordinary flexibility be required, the disks may be made of sheet-steel and secured to cast-metal hubs. In this case the ring E is used, and may also be made of cast metal.

What I claim as new, and desire to secure by Letters Patent, is—

1. A flexible coupling for shafts, substantially as hereinbefore set forth, which consists of two thin metal disks separated from each other by intervening flanges or a ring near the periphery, and having hubs for securing them on the shaft-sections.

2. In a shaft-coupling, the combination, substantially as specified, of the disks A B, having flanges $a$ $b$, hubs D, and fastening-bolts C.

3. The combination, substantially as set forth, in a flexible shaft-coupling, of the disk A, having flange $a'$, and the disk B, having the flange $b$, and made small enough to fit within the flange $a'$ of disk A, with bolts C, for securing the parts together, and hubs D, for securing them on the ends of the shaft-sections.

FRANCIS M. ROOTS.

Witnesses:
GEO. J. MURRAY,
EDGAR O'HAIR.